3,030,298
Patented Apr. 17, 1962

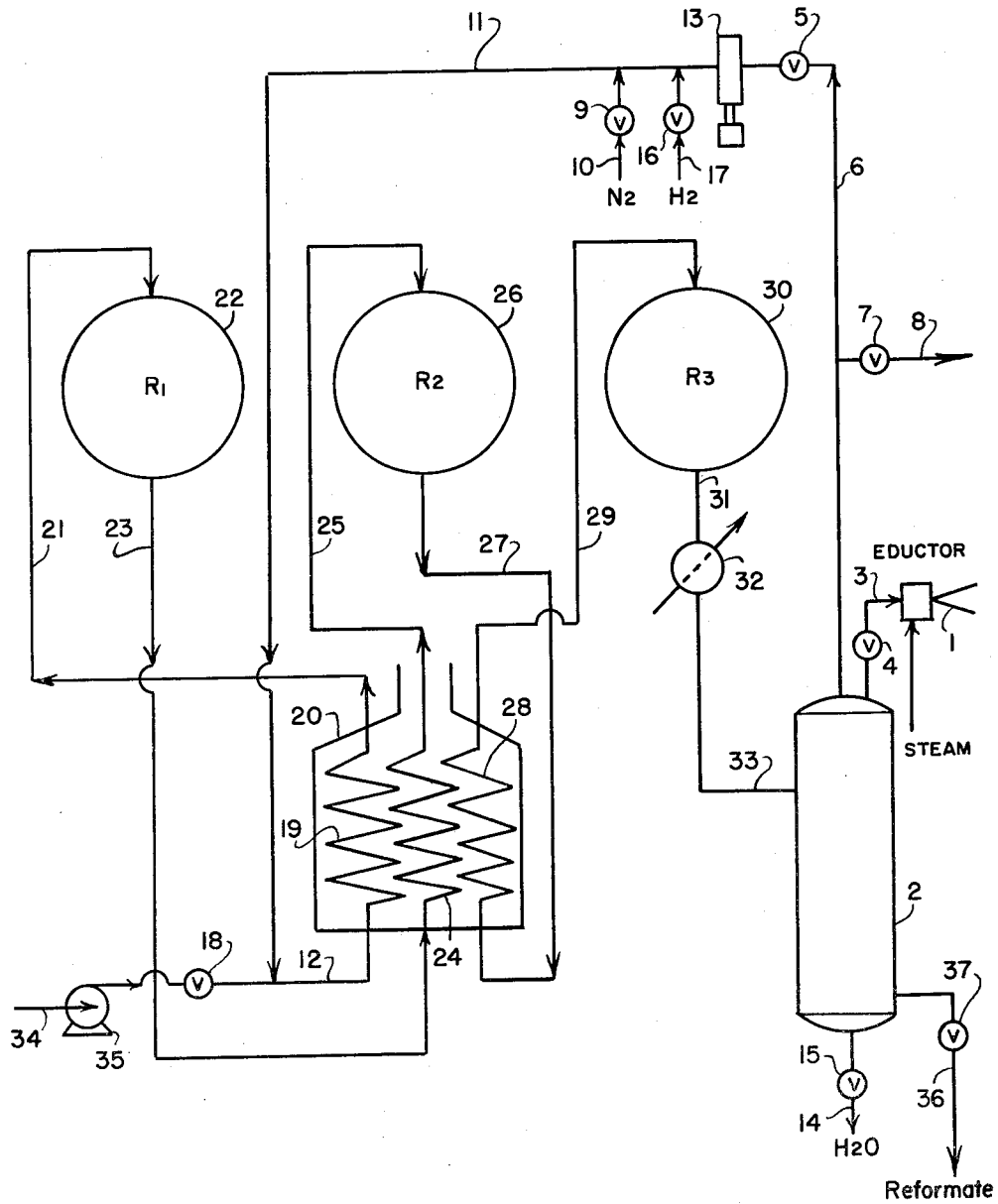

3,030,298
METHOD OF PUTTING REFORMER ON-STREAM WITH REDUCED HYDROGEN LOSS
John Ernest Baker, Swedesboro, N.J., assignor to Socony Mobil Oil Company, Inc., a corporation of New York
Filed Jan. 29, 1959, Ser. No. 789,823
11 Claims. (Cl. 208—65)

The present invention relates to reforming in the presence of a static bed of catalyst and hydrogen-containing gas and, more particularly, to a method of putting a reformer on-stream, especially when there is a carbonaceous deposit on the catalyst of the static bed.

During reforming in the presence of hydrogen and a reforming catalyst a carbonaceous deposit, generally designated coke, is laid down on the catalyst. As the on-stream period proceeds the amount of coke deposited increases. The deposition of this carbonaceous deposit causes the catalyst to lose activity. Eventually, since a reformate having the required octane rating cannot be produced except at a reaction temperature at which the catalyst is irreversibly deactivated, it is necessary and conventional to remove the coke by combustion in a combustion-supporting stream of gas containing oxygen.

On the other hand mechanical failure or other causes in no wise related to loss of catalyst activity often requires that the reformer be taken off-stream. That is, the naphtha feed is no longer introduced into the reforming reactor, i.e., reformer, the hydrogen-containing gas is no longer circulated, and the temperature(s) of the furnace or furnaces is allowed to drop several hundreds of degrees below the operating temperature.

When the cause of the mechanical or other failure has been removed it is general practice to evacuate the system, purge the system with nitrogen, depressure the system to remove the preponderant portion of the nitrogen, and pressure the system with hydrogen or hydrogen-containing gas. After pressuring the system with hydrogen or hydrogen-containing gas, the heaters or furnaces are fired and the hydrogen gas circulated. The temperature of the circulating hydrogen gas is raised incrementally until the temperature of the circulating hydrogen gas reaches the reforming temperature required to produce reformate having the required octane rating. The usual minimum reforming temperature with virgin or freshly regenerated platinum catalyst, for example, is in excess of 750° F. and generally of the order of at least 800° F. (with loss in activity due to the deposition of carbon minimum reforming temperatures are in excess of 800° F.)

It has been established that a reaction between hydrogen and the carbonaceous deposit on a reforming catalyst, particularly a platinum-type catalyst is initiated at about 750° F. As a consequence of the reaction between the coke and the hydrogen of the circulating gas considerable amounts of hydrogen are consumed in bringing the temperature of the static bed of reforming catalyst up to a reforming temperature in excess of 750° F. and the higher the reforming temperature required and the greater the amount of coke on the catalyst, the greater the loss of hydrogen as a result of the reaction discussed briefly hereinbefore. It has now been discovered that it is not necessary to remove the purge gas, e.g., nitrogen from the system and replace the purge gas with hydrogen or hydrogen-containing gas such as recycle gas. It has been found that the purge gas, nitrogen, for example, can be circulated and during circulation heated to the required reforming temperature in excess of 750° F. When the circulating purge gas and the temperature(s) of the bed or beds of catalyst have reached at least the minimum temperature required for the dehydrogenation of naphthenes which is not less than about 850° F., hydrogen, or gas containing at least about 60 percent by volume of hydrogen such as recycle gas or naphtha containing at least 20 percent by volume of naphthenes or a mixture of hydrogen or hydrogen-containing gas such as recycle gas, and naphtha containing at least about 20 percent by volume of naphthenes is introduced into the circulating stream of purge gas and the reforming operation carried out without loss of yield and with a reduced off-stream period.

The steps of the conventional method of going on-stream are compared with those of the present method of going on-stream in Table I.

TABLE I

| Step No. | Conventional Method | Method of the Present Invention |
|---|---|---|
| 1 | Evacuate to about 25 inches of mercury vacuum. | Same. |
| 2 | Purge with nitrogen. | Do. |
| 3 | Repeat 1 and 2 until the oxygen content of the gas is less than 0.8 percent by volume. | Do. |
| 4 | Pressure system with hydrogen. | Pressure system with, nitrogen to about 30-55 p.s.i.g. |
| 5 | Circulate and heat hydrogen to reaction temperature. | Circulate and heat nitrogen to required temperature in excess of about 750° F. |
| 6 | Introduce naphtha at about 15 to 25% of design rate. | Introduce hydrogen or recycle gas, or naphtha, or both. (Naphtha introduced at about 15 to 20% of design rate until reaction pressure reached then at least at design rate.) |
| 7 | Introduce naphtha at rate dependent upon local conditions and in excess of 25% of design rate. | |

In accordance with the present invention the nitrogen is not purged from the system, the reactor or reactors are not evacuated to 25 in. of mercury vacuum after purging with nitrogen, but the hydrogen-containing gas or the naphtha feed or the hydrogen-containing gas and the naphtha feed are added to the inert circulating gas, after temperature in reactor has reached reaction temperature the charge vapors enter the reactor at the desired rate. Accordingly, it is an object of the present invention to provide a means for bringing a platinum-type reactor on-stream by pressuring the reactor to about 30 to about 55 p.s.i.g. with nitrogen, circulating the nitrogen or other inert gas until the temperature at the reactor outlets at least reaches a temperature at which naphthenes are dehydrogenated by the catalyst in the reactor(s) say a temperature of about 850° F. The temperature at which the hydrogen and/or naphtha is introduced into the circulating inert gas is dependent upon the target octane rating of the reformate and the activity, i.e., age of the catalyst. Thereafter, hydrogen-containing gas, or naphtha, particularly a naphtha containing at least 20 percent naphthenes, or naphtha and hydrogen-containing gas, are introduced into the circulating inert gas stream and the temperature of the inert gas stream raised to a reaction temperature. Thereafter, as the temperature rises and the pressure in the reactor builds up as a result of the production of hydrogen, a portion of the recycle gas is vented to maintain a reaction pressure. Thereafter, the naphtha is introduced into the recycle gas in the reaction proportions.

Thus, for example, when a platinum-type reforming catalyst has been off-stream, the reactor and auxiliary piping, heaters, etc. are evacuated to about 25 inches of mercury vacuum and the system filled with nitrogen to a pressure of about 30–55 p.s.i.g. The nitrogen or other inert gas is then circulated through the heater and the reactor or reactors until the temperature at the reactor(s) outlet(s) is about 850° F. At this time, three choices are open to the operator: (1) The operator can add naphtha to the circulating inert gas at a point ahead of the first heater at about 15 to 20 percent of design rate, (2) the operator can add hydrogen or hydrogen-containing gas to the circulating inert gas at a point ahead of the first heater until the hydrogen content of the circulating gas is at least about 50 percent by volume and then naphtha is added at 15–25 percent of the designed charge rate until the reaction pressure is reached, or (3) the operator can add naphthene-containing naphtha at about 15–20 percent of design rate and hydrogen-containing gas until the system is at reaction pressure. [Said naphtha contains at least about 20 percent naphthenes and contains only innocuous amounts of sulfur, nitrogen and arsenic, i.e., not more than about 20 p.p.m. of sulfur, not more than 1 p.p.m. of nitrogen, and is essentially free of arsenic. (A naphtha is essentially free of arsenic when the concentration of arsenic in the naphtha is insufficient to deactivate the catalyst within the life of the catalyst as determined by other factors such as the reaction temperature required to produce a reformate having an octane rating of at least 100 ($R+3$ cc.), yield, and mechanical strength of the catalyst. The life of a catalyst containing 0.35 percent by weight of platinum as determined by these other factors is usually of the order of about 2 years.)] When the system is at reaction pressure the naphtha (naphthene content the same or different to that originally introduced into the circulating gas) charge rate is increased to a rate dependent upon local conditions and in excess of 25 percent of designed charge rate.

Thus, for example, in a three reactor reforming unit employing platinum-type reforming catalyst and having a heater upstream of each reactor when the unit has been off-stream, to put the unit on-stream the system is evacuated to about 25 inches of mercury vacuum and purged with nitrogen until the oxygen content of the gas is less than 0.8 percent by volume. The nitrogen or other inert gas is heated and circulated through the reactor(s) until the temperature of the inert gas at the outlet of the reactor(s) is about 850° F. Hydrogen is then introduced into the circulating stream of inert gas and the inert gas and hydrogen circulated until the temperature at the outlet of the last reactor reaches reaction temperature. When the temperature at the outlet of the last reactor reaches reaction temperature then naphtha containing only innocuous amounts of sulfur, nitrogen and arsenic is introduced into the circulating stream and heated to reaction temperature. The mixture of naphtha, inert gas and hydrogen then is circulated through the three reactors and the high pressure separator. After dehydrogenation of the naphthenes is initiated gas is bled from the vent of the high pressure separator in amounts sufficient to maintain the reaction pressure. Thereafter an amount of recycle gas about equal to the make gas is vented.

For purpose of illustration, reference is made to FIGURE 1. FIGURE 1 is a flow sheet illustrating the flow of liquids and gases through a three reactor adiabatic reforming system employing platinum reforming catalyst. Auxiliary equipment, such as heat exchangers, stabilizers, fractionators, and the like have been omitted from the flow of sheet of FIGURE 1. Reactors $R_1$, $R_2$ and $R_3$ are filled with platinum-type reforming catalyst having a carbonaceous deposit thereon. The system is then evacuated to about 25 inches of mercury vacuum by means of an eductor 1 connected with separator 2 through conduit 3 under control of valve 4 (with valves 15, 37, 7, 5 and 18 closed). When the pressure in the system has been reduced to about 25 inches of mercury vacuum valve 4 in conduit 3 is closed and valve 9 in conduit 10 is opened and nitrogen or other inert gas is introduced into conduit 11. The inert gas flows through conduit 11 to conduit 12 and thence to conduit 6 until the system is filled with nitrogen and the pressure in the system is about 30 to about 55 p.s.i.g.

When the pressure in the system reaches about 30 to about 55 p.s.i.g. valve 9 is closed and valve 5 opened, the heater is fired and the nitrogen or other inert gas is circulated through the system by compressor 13. As the temperature of the circulating inert gas is raised the pressure in the system rises, for example, to about 200 p.s.i.g. During the circulation of the heated inert gas through the system water occasionally accumulates in separator 2. From time to time or continuously as the situation makes desirable water is drawn from separator 2 through pipe 14 under control of valve 15.

When the temperature of the circulating inert gas reaches a temperature at which naphthenes dehydrogenate and dependent upon the activity, i.e., age of the catalyst, usually a minimum of about 850° F., valve 16 in conduit 17 is opened and hydrogen or hydrogen-containing gas flows from a source not shown through conduit 17 to conduit 11.

The hydrogen or hydrogen-containing gas is mixed with the inert gas in conduit 11 and circulated until the temperature of the circulating gas reaches reaction temperature, say about 900° F. Admixture of hydrogen with the circulating mixture of inert gas and hydrogen is continued until the circulating gas contains at least about 50 percent hydrogen by volume.

Thus, the inert gas and admixed hydrogen is circulated by compressor 13 through conduit 11, conduit 12 (valve 18 closed) coil 19 in heater 20, conduit 21, reactor 22, conduit 23, coil 24, conduit 25, reactor 26, conduit 27, coil 28, conduit 29, reactor 30, conduit 31, cooler 32, conduit 33, separator 2 (any condensed water is drawn off separator 2 through pipe 14) and conduit 6 to the suction side of compressor 13.

When the circulating gas contains at least about 50 percent hydrogen by volume, naphtha is drawn from a source not shown through pipe 34 by pump 35 and, with valve 18 open, discharged into conduit 12 and admixed with the circulating gas. Thereafter, when the dehydrogenation of the naphthenes has been initiated an amount of circulating gas is vented through conduit 8 which is about equivalent to the gas made in the reaction.

The unit can be put on-stream in a similar manner without admixing hydrogen or hydrogen-containing gas with the inert gas before introducing naphtha into the circulating gas stream.

Thus, illustrating this embodiment of the present invention by reference to the drawings, reactors $R_1$, $R_2$ and $R_3$ contain catalyst having a deposit of coke. The system is evacuated by eductor 1 to about 25 inches of mercury vacuum by closing valves 15, 37, 7, 18 and 5 in conduits 14, 36, 8, 12 and 6 respectively and opening valve 4 in conduit 3. After the pressure in the unit has been reduced to about 25 inches of mercury vacuum, valve 4 is closed and valve 9 in conduit 10 is opened. Inert gas such as nitrogen flows through conduit 10 to conduit 11 until the pressure in the unit is about 50 p.s.i.g. Valve 9 is closed, valve 5 is opened and the heater 20 is fired. The inert gas is then circulated through the unit by compressor 13. The circulating gas flows from compressor 13 through conduit 11 to conduit 12, coil 19, conduit 21, reactor 22, conduit 23, coil 24, conduit 25, reactor 26, conduit 27, coil 28, conduit 29, reactor 30, conduit 31 and cooler 32. In cooler 32 the circulating inert gas is cooled to a temperature such that water in the gas is condensed; usually a temperature of about 75° to about 100° F. is employed. The cooled circulating gas and condensed water flow through conduit 33 to high pressure separator 2 where the inert gas is separated from the condensed water. The condensed water is drawn-off through pipe 14 under control of valve 15. The inert gas flows from separator 2 through conduit 6 to the suction side of compressor 13.

When the temperature of the circulating inert gas reaches a temperature about 50° F. below the reaction temperature, e.g., about 850° F. for a reaction temperature of about 900° F., valve 18 in conduit 12 is opened and a naphtha containing at least about 20 percent of naphthenes is drawn from a source not shown through pipe 34 by pump 35 and discharged into conduit 12. In conduit 12 the naphtha is mixed with the circulating inert gas, i.e., containing little, if any, hydrogen at a rate of about 15 to about 20 percent of design capacity. Thus, when the designed capacity is 20,000 barrels of naphtha per stream day the naphtha is charged at the rate of about 3000 to 4000 barrels per day to form a preliminary charge mixture.

The preliminary charge mixture flows through conduit 12 to coil 19 where the preliminary charge mixture is heated to a reaction temperature dependent upon the activity of the catalyst and the target octane rating of the reformate. The heated preliminary charge mixture flows from coil 19 through conduit 21 to reactor 22.

In reactor 22 at least a part of the naphthenes in the charge are dehydrogenated thereby producing hydrogen and aromatics. The effluent of reactor 22, i.e., the first effluent, flows from reactor 22 through conduit 23 to coil 24 where the first effluent is reheated to a reaction temperature. From coil 24 the reheated first effluent flows through conduit 25 to reactor 26.

In reactor 26 more hydrogen is produced by dehydrogenation and the effluent of reactor 26, designated hereinafter second effluent, comprising reformed naphtha, unreformed naphtha, inert gas, and hydrogen produced in the reaction, designated thereinafter as in situ hydrogen, flows through conduit 27 to coil 28. In coil 28 the second effluent is reheated to reaction temperature. The reheated second effluent flows from coil 28 through conduit 29 to reactor 30.

In reactor 30 the reforming reaction is completed to produce a reformate having the target octane rating. The effluent from reactor 30, designated third effluent, flows from reactor 30 through conduit 31 to cooler 32.

In cooler 32 the third effluent is cooled to a temperature at which at the existing pressure, i.e., reaction pressure less pressure drop due to intervening piping, etc., the $C_3$ and heavier hydrocarbons are condensed. The cooled third effluent flows from cooler 32 through conduit 33 to separator 2.

In separator 2 the condensed $C_3$ and heavier hydrocarbons are separated from the uncondensed portion of the third effluent comprising $C_1$ and $C_2$ hydrocarbons, inert gas, and in situ hydrogen. The $C_3$ and heavier hydrocarbons flow from separator 2 through pipe 36 under control of valve 37, to stabilizer and/or other fractionating means whereby a gasoline having the required Reid vapor pressure and the target octane is obtained.

The uncondensed portion of the third effluent, as previously stated, comprising $C_1$ and $C_2$ hydrocarbons, inert gas, and in situ hydrogen, hereinafter designated recycle gas, flows from separator 2 through conduit 6. When the production of in situ hydrogen and $C_1$ and $C_2$ hydrocarbons is sufficient to raise the pressure above the reaction pressure a portion of the recycle gas, about equivalent to the volume of gas produced in the reaction, i.e., the gas make, is drawn-off through conduit 8 under control of valve 7. Usually, the amount of recycle gas diverted through conduit 8 is sufficient to maintain the recycle gas at reaction pressure.

When the pressure in the system reaches reaction pressure, the charge rate of the naphtha is raised to a rate dependent upon local conditions and in excess of 25 percent of the designed charge rate. The pressure in the system usually reaches reaction pressure within about 15 to 30 minutes after the naphtha is first charged.

In a further embodiment of the present invention hydrogen-containing gas and naphtha are mixed with the circulating inert gas after the temperatures of the reactors reach reaction temperature. Thus, with reactors 22, 26 and 30 filled with coked catalyst the system is evacuated and then filled with nitrogen or other inert gas in the manner described hereinbefore. The inert gas is circulated through the unit and the temperature thereof raised to about 850° F. During the circulation of the inert gas any water accumulating in separator 2 is drawn-off through conduit 14. When the temperature of the inert gas is within about 50° F. of the reaction temperature, hydrogen flows from a source not shown through conduit 17 with valve 16 open to conduit 11. Compressor 13 pumps the mixture of inert gas and hydrogen through conduit 11 to conduit 12. From conduit 12 the mixture of inert gas and hydrogen flows through reactors 22, 26 and 30, conduit 31, cooler 32, conduit 33, separator 2, conduit 6, and with valve 5 open back to the suction side of compressor 13. The mixture of inert gas and hydrogen is circulated through the unit until the temperature at the vapor outlet of reactor 30 is about reaction temperature. Thereafter, naphtha containing innocuous amounts of sulfur, nitrogen and arsenic drawn from a source not shown through pipe 34 by pump 35 is discharged into conduit 12 with valve 18 open. The mixture of naphtha, hydrogen and inert gas flows through coil 19 in heater 20 to conduit 21. During the flow through coil 19 the mixture of naphtha, hydrogen and inert gas is heated to a reaction temperature. The mixture flows through conduit 21 to reactor 22. The effluent of reactor 22 flows through conduit 23 to coil 24 in heater 20 where the effluent from reactor 22 is heated to reaction temperature. The heated effluent of reactor 22 comprising naptha, inert gas, added hydrogen and hydrogen made in reactor 22, hereinafter designated in situ hydrogen, flows through conduit 25 to reactor 26. The effluent of reactor 26 flows through conduit 27 to coil 28 where the reactor effluent is reheated to reaction temperature. The reheated effluent of reactor 26 flows through conduit 29 to reactor 30. The effluent of reactor 30 flows through conduit 31 to condenser 32. In condenser 32 the effluent of reactor 30 is cooled to a temperature at which $C_3$ and heavier hydrocarbons are condensed. The effluent from reactor 30 comprising hydrogen, inert gas and in situ hydrogen and $C_1$ and heavier hydrocarbons flows through conduit 33 to separator 2.

In separator 2 the uncondensed portion of the effluent is separated from the condensed portion of the effluent from reactor 30. The condensate flows from separator 2 through pipe 36 under control of valve 37. The uncondensed portion of the effluent from reactor 30 flows through conduit 6 to the suction side of compressor 13. Compressor 13 discharges into conduit 11 through which the mixture of added hydrogen, in situ hydrogen and inert gas flows to conduit 12. When the production of in situ hydrogen, $C_1$ and $C_2$ hydrocarbons is sufficient to raise the pressure in the system above the predetermined reaction pressure sufficient recycle gas is vented through conduit 8 to maintain a reaction pressure; thereafter that amount of recycle gas is vented which is about equivalent to the amount of gas made in the reaction.

For example, when initially putting a reforming unit on-stream after purging the unit to an oxygen concentration less than 0.8 percent by volume the unit is pressured to about 50 to 55 p.s.i.g. with nitrogen. The nitrogen is circulated and heated. Since the reaction temperature required to produce gasoline of the target octane number 100 with this catalyst is about 950° F. at the vapor inlet to the reactor, the circulating nitrogen is heated to about 900° to about 950° F. When the temperature of the circulating nitrogen is about 900° to about 950° F. hydrogen is introduced until the circulating gas is about one-third nitrogen and about two-thirds hydrogen by volume and the pressure is less than the operating reactor pressure, for example, about 200 p.s.i.g. for a unit operating at 500 p.s.i.g. After introduction of all of the hydrogen and when the temperature of the gases entering the first reaction zone is about 950° F. the naphtha to be reformed is introduced into the heater upstream of the first reaction zone and in admixture with the circulating mixture of nitrogen and hydrogen is passed through the reaction zones.

Dehydrogenation of the naphtha occurs with the production of hydrogen and an increase in pressure which builds up to the desired unit pressure of say about 500 p.s.i.g. for a high pressure reforming unit. Thereafter, substantially dry gas is vented from the unit to maintain the desired reactor pressure, e.g., about 500 p.s.i.g. for a high pressure reforming unit. In a high pressure reforming unit the pressure builds up to about 500 p.s.i.g. in about 15 to 30 minutes. The temperature to which the circulating nitrogen is heated before admixing hydrogen with the circulating nitrogen is dependent upon the target octane rating of the reformate and the age of the catalyst but is not less than the minimum temperature at which naphthenes are dehydrogenated in the presence of the reforming catalyst. For platinum reforming catalysts the minimum naphthenate dehydrogenation temperature is about 850° F. The maximum temperature for the dehydrogenation of naphthenes is limited primarily by the temperature at which the catalyst is heat damaged and by thermal conversion. For most platinum reforming catalysts the maximum temperature is about 980° F.

From the foregoing those skilled in the art will recognize that the present invention provides for evacuating a reforming reactor or a plurality of reforming reactors to a vacuum of about 25 inches of mercury, and then filling the system with inert gas, e.g., nitrogen to a pressure of about 30 to about 55 p.s.i.g. Thereafter the nitrogen is circulated through the system and heated in the heaters until the temperature of the gas leaving the reactor or the last reactor of the plurality of reactors has reached a temperature about 50° F. less than the reaction temperature, say about 815° F., to 850° F. Thereafter, hydrogen or naphtha or hydrogen and naphtha is introduced into the circulating stream of inert gas and passed through the reactors at a reaction temperature. The naphtha is introduced into the circulating stream of inert gas at a rate which is about 15 to 20 percent of the designed charge rate until the pressure in the system reaches reaction pressure. Thereafter, the naphtha is charged to the unit at a rate dependent upon local conditions and not less than 25 percent of the designed rate. When the system reaches reaction pressure sufficient of the recycle gas is vented to maintain the reaction pressure.

I claim:

1. In a multi-reaction zone reforming unit comprising at least a head and a tail reaction zone, each of the aforesaid reaction zones containing a static bed of platinum-group metal reforming catalyst, a heater up-stream of each of the aforesaid reaction zones, a condenser down-stream of the aforesaid tail reaction zone for cooling the effluent of the aforesaid reaction zone to condense components of said effluent boiling above the boiling point of $C_2$ hydrocarbons, a separator down-stream of the aforesaid condenser for separating uncondensed components of said effluent from condensate comprising condensed components of said effluent, a pump down-stream of the aforesaid separator for recycling at least part of the aforesaid uncondensed components of said effluent to the aforesaid heater up-stream of the aforesaid head reaction zone and means for removing said condensate from said separator, all of the aforesaid reaction zones, heaters, condenser, separator, and pump being piped for series flow of fluids from the aforesaid heater up-stream of the aforesaid head reaction zone to the aforesaid separator, wherein the method of putting said reforming unit on-stream comprises purging said reforming unit with inert gas at a pressure substantially less than reforming pressure until the oxygen content of the effluent of the aforesaid reaction zone is less than 0.8 percent by volume, introducing into said reforming unit reforming gas selected from the group consisting of hydrogen and hydrogen-containing gas until the pressure in said reforming unit is a reforming pressure, heating said reforming gas, circulating said heated reforming gas to raise the temperature in each of said reaction zones to reforming temperature, and introducing naphtha to be reformed into said reforming unit at reforming pressure and temperature, the improvement which comprises (1) circulating the aforesaid inert gas through the aforesaid reforming unit at substantially less than reforming pressure, (2) heating the aforesaid circulating inert gas until the temperature at the outlet of the aforesaid tail reaction zone is about 50° F. below reforming temperature whilst the pressure in the aforesaid reaction zones is substantially less than reforming pressure, (3) whilst the unit pressure is substantially less than reforming pressure in a cyclic manner mixing with the aforesaid heated circulating inert gas up-stream of the aforesaid heater up-stream of the aforesaid head reaction zone a pressurizing component selected from the group consisting of (A) naphthene-containing naphtha containing not more than innocuous concentrations of sulfur, nitrogen, arsenic and lead at substantially less than designed rate, (B) hydrogen-containing gas, and (C) a mixture of (A) and (B) to form with the heated circulating inert gas a pressurizing mixture consisting of the aforesaid inert gas and at least one of the aforesaid pressurizing components, (4) passing said pressurizing mixture through the aforesaid heaters, reaction zones, condenser, and separator to obtain uncondensed pressurizing mixture separated from condensed pressurizing mixture, (5) removing condensed pressurizing mixture, and (6) recycling uncondensed pressurizing mixture to the heater up-stream of the head reaction zone, (7) continuing the aforesaid operations (3) and (4) until the unit pressure reaches reforming pressure, (8) with the unit at reforming pressure increasing the amount of naphtha per unit time admixed with said recycled uncondensed pressurizing mixture and increasing the temperature of the resultant mixture until the temperature at the inlets of the aforesaid reaction zones are the reforming temperatures required to produce reformate having the required octane rating whilst venting uncondensed components of the aforesaid resultant mixture to maintain the aforesaid reforming pressure, (9) with the unit at reforming pressure and the temperatures at the inlets of the aforesaid reaction zones at reforming temperatures increasing the amount of naphtha per unit of time admixed with uncondensed components of the aforesaid resultant mixture to at least designed rate, and (10) recovering condensed components of the tail reaction zone effluent as reformate having the required octane rating whereby said reforming unit is put on-stream.

2. The method of claim 1 wherein the inert gas is nitrogen.

3. The method of claim 1 wherein the inert gas is nitrogen, wherein as the in situ hydrogen is produced and the pressure in the unit reaches a predetermined reaction pressure sufficient of said uncondensed effluent is vented to maintain said reaction pressure.

4. The method of putting on-stream a reforming unit as set forth and described in claim 1 wherein the inert gas is nitrogen, wherein the only pressurizing component is naphtha containing at least 20 percent naphthenes and devoid of more than innocuous amounts of sulfur, nitrogen, arsenic and lead.

5. The method of putting on-stream a reforming unit as set forth and described in claim 1 wherein the inert gas is nitrogen, wherein only hydrogen-containing gas is mixed with the inert gas unitl the pressure in the system reaches a predetermined reaction pressure and wherein thereafter only naphtha is added to the circulating gas.

6. The method of putting on-stream a reforming unit as set forth and described in claim 1 wherein the inert gas is nitrogen and wherein hydrogen-containing gas and naphtha devoid of more than innocuous amounts of sulfur, nitrogen, arsenic, and lead are the pressurizing components admixed with the circulating gas until the pressure in the system reaches a predetermined reaction pressure and wherein thereafter only naphtha is added to the circulating gas.

7. The method of claim 1 wherein the inert gas is nitrogen, and wherein when the pressure of the system is less than a predetermined reaction pressure naphtha is added at about 15 to about 20 percent of the designed charge rate.

8. The method of claim 1 wherein the inert gas is nitrogen and wherein when the pressure of the system is less than a predetermined reaction pressure naphtha is added at about 15 to about 20 percent of the designed charge rate and at a rate dependent upon local conditions and not less than 25 percent of the designed charge rate when the pressure in the system is a predetermined reaction pressure.

9. The method of claim 1 wherein the inert gas is nitrogen, wherein the predetermined reaction pressure is within the range of about 100 to about 1000 pounds per square inch, wherein when the pressure in the system is less than the aforesaid predetermined reaction pressure naphtha is introduced into the system at about 15 to about 20 percent of the designed rate, and wherein when the pressure in the system is the aforesaid predetermined reaction pressure naphtha is introduced into the system at a rate dependent upon local conditions and not less than 25 percent of the designed rate.

10. The method of claim 1 wherein the inert gas is nitrogen, wherein the predetermined reaction pressure is within the range of about 100 to about 1000 pounds per square inch, wherein when the pressure in the system is less than the aforesaid predetermined reaction pressure naphtha is introduced into the system at about 15 to about 20 percent of the designed rate, wherein where the pressure in the system is the aforesaid predetermined reaction pressure naphtha is introduced into the system at a rate dependent upon local conditions and not less than 25 percent of the designed rate, and wherein a portion of the uncondensed reaction zone effluent is vented to maintain said predetermined reaction pressure.

11. In a multi-reaction zone reforming unit comprising at least a head and a tail reaction zone, each of the aforesaid reaction zones containing a static bed of platinum-group metal reforming catalyst, a heater up-stream of each of the aforesaid reaction zones, a condenser down-stream of the aforesaid tail reaction zone for cooling the effluent of the aforesaid reaction zone to condense components of said effluent boiling above the boiling point of $C_2$ hydrocarbons, a separator down-stream of the aforesaid condenser for separating uncondensed components of said effluent from condensate comprising condensed components of said effluent, a pump down-stream of the aforesaid separator for recycling at least part of the aforesaid uncondensed components of said effluent to the aforesaid heater up-stream of the aforesaid head reaction zone and means for removing said condensate from said separator, all of the aforesaid reaction zones, heaters, condenser, separator, and pump being piped for series flow of fluids from the aforesaid heater up-stream of the aforesaid head reaction zone to the aforesaid separator, wherein the method of putting said reforming unit on-stream comprises purging said reforming unit with inert gas at a pressure substantially less than reforming pressure until the oxygen content of the effluent of the aforesaid reaction zone is less than 0.8 percent by volume, introducing into said reforming unit reforming gas selected from the group consisting of hydrogen and hydrogen-containing gas until the pressure in said reforming unit is a reforming pressure, heating said reforming gas, circulating said heated reforming gas to raise the temperature in each of said reaction zones to reforming temperature, and introducing naphtha to be reformed into said reforming unit at reforming pressure and temperature, the improvement which comprises (1) circulating the aforesaid inert gas through the aforesaid reforming unit at substantially less than reforming pressure of at least 500 p.s.i.g., (2) heating the aforesaid circulating inert gas until the temperature at the outlet of the aforesaid tail reaction zone is about 50° F. below reforming temperature but at least 750° F. whilst the pressure in the aforesaid reaction zones is about 200 p.s.i.g., (3) whilst the unit pressure is substantially less than reforming pressure in a cyclic manner mixing with the aforesaid heated circulating inert gas up-stream of the aforesaid heater up-stream of the aforesaid head reaction zone a pressurizing component selected from the group consisting of (A) naphthene-containing naphtha containing not more than innocuous concentrations of sulfur, nitrogen, arsenic and lead at substantially less than designed rate, (B) hydrogen-containing gas, and (C) a mixture of (A) and (B) to form with the heated circulating inert gas a pressurizing mixture consisting of the aforesaid inert gas and at least one of the aforesaid pressurizing components, (4) passing said pressurizing mixture through the aforesaid heaters, reaction zones, condenser, and separator to obtain uncondensed pressurizing mixture separated from condensed pressurizing mixture, (5) removing condensed pressurizing mixture, and (6) recycling uncondensed pressurizing mixture to the heater upstream of the head reaction zone, (7) continuing the aforesaid operations (3) and (4) until the unit pressure reaches reforming pressure of about 500 p.s.i.g., (8) with the unit at reforming pressure increasing the amount of naphtha per unit time admixed with said recycled uncondensed pressurizing mixture and increasing the temperature of the resultant mixture until the temperature at the inlets of the aforesaid reaction zones are the reforming temperatures required to produce reformate having the required octane rating whilst venting uncondensed components of the aforesaid resultant mixture to maintain the aforesaid reforming pressure, (9) with the unit at reforming pressure and the temperatures at the inlets of the aforesaid reaction zones at reforming temperatures increasing the amount of naphtha per unit of time admixed with uncondensed components of the aforesaid resultant mixture to at least designed rate, and (10) recovering condensed components of the tail reaction zone effluent as reformate having the required octane rating whereby said reforming unit is put on-stream.

References Cited in the file of this patent

UNITED STATES PATENTS

| | | |
|---|---|---|
| 2,880,161 | Moore et al. | Mar. 31, 1959 |
| 2,880,162 | Moore | Mar. 31, 1959 |
| 2,904,503 | Welty et al. | Sept. 15, 1959 |
| 2,943,999 | Moore et al. | July 5, 1960 |

UNITED STATES PATENT OFFICE
CERTIFICATE OF CORRECTION

Patent No. 3,030,298 April 17, 1962

John Ernest Baker

It is hereby certified that error appears in the above numbered patent requiring correction and that the said Letters Patent should read as corrected below.

Column 3, line 66, for "flow of sheet of" read -- flow sheet of --.

Signed and sealed this 14th day of August 1962.

(SEAL)
Attest:

ERNEST W. SWIDER
Attesting Officer

DAVID L. LADD
Commissioner of Patents